United States Patent
Furudate et al.

(10) Patent No.: US 9,555,399 B2
(45) Date of Patent: *Jan. 31, 2017

(54) VISIBLE-LIGHT-RESPONSIVE TITANIUM OXIDE MICROPARTICLE DISPERSION, METHOD FOR MANUFACTURING SAME, AND MEMBER HAVING SURFICIAL PHOTOCATALYST THIN FILM FORMED USING SAME DISPERSION

(71) Applicant: SHIN-ETSU CHEMICAL CO., LTD., Tokyo (JP)

(72) Inventors: Manabu Furudate, Kamisu (JP); Tomohiro Inoue, Kamisu (JP); Yoshitsugu Eguchi, Kamisu (JP); Tadashi Amano, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 14/357,320

(22) PCT Filed: Oct. 10, 2012

(86) PCT No.: PCT/JP2012/076164
§ 371 (c)(1),
(2) Date: May 9, 2014

(87) PCT Pub. No.: WO2013/073320
PCT Pub. Date: May 23, 2013

(65) Prior Publication Data
US 2014/0309103 A1    Oct. 16, 2014

(30) Foreign Application Priority Data

Nov. 14, 2011 (JP) ................................. 2011-248399
Aug. 30, 2012 (JP) ................................. 2012-189409

(51) Int. Cl.
*B01J 23/847* (2006.01)
*B01J 37/02* (2006.01)
*B01J 35/00* (2006.01)
*B01J 21/06* (2006.01)

(52) U.S. Cl.
CPC ........... *B01J 23/8472* (2013.01); *B01J 35/004* (2013.01); *B01J 35/0013* (2013.01); *B01J 37/0205* (2013.01); *B01J 37/0215* (2013.01); *B01J 21/063* (2013.01)

(58) Field of Classification Search
CPC ..... B01J 35/0013; B01J 35/004; B01J 35/002; B01J 35/02; B01J 37/0205; B01J 37/0215; B01J 37/08; B01J 37/34; B01J 37/344; B01J 23/8472; B01J 23/847; B01J 23/14; B01J 23/02–23/36; B01J 23/76; B01J 21/06; B01J 21/063; C01G 23/04; C01G 23/047; C01G 19/02

See application file for complete search history.

(56) References Cited

U.S. PATENT DOCUMENTS

| 2012/0055334 A1 | 3/2012 | Ogata et al. |
| 2012/0070675 A1 | 3/2012 | Ogata et al. |

FOREIGN PATENT DOCUMENTS

| JP | 64-3020 A | 1/1989 |
| JP | 2-255532 A | 10/1990 |
| JP | 6-279725 A | 10/1994 |
| JP | 7-247119 A | 9/1995 |
| JP | 10-67516 A | 3/1998 |
| JP | 10-182152 A | 7/1998 |
| JP | 2004-182558 A | 7/2004 |
| JP | 2005-170687 A | 6/2005 |
| JP | 2009-148700 A | 7/2009 |
| JP | 2009-179497 A | 8/2009 |
| JP | 2011-136297 A | 7/2011 |
| JP | 2011-136879 A | 7/2011 |
| WO | WO 2010/125690 A1 | 11/2010 |
| WO | WO 2010/137337 A1 | 12/2010 |

OTHER PUBLICATIONS

Tanaka JP11-188270, machine translation.*
International Search Report, mailed Jan. 22, 2013, issued in PCT/JP2012/076164.

* cited by examiner

*Primary Examiner* — Melvin C Mayes
*Assistant Examiner* — Smita Patel
(74) *Attorney, Agent, or Firm* — Birch, Stewart, Kolasch & Birch, LLP

(57) ABSTRACT

Provided is a visible-light-responsive titanium oxide microparticle dispersion or the like readily enabling manufacture of a highly transparent photocatalyst thin film demonstrating photocatalyst activity even using visible light alone, and having exceptional titanium oxide microparticle dispersion stability even after storage for prolonged periods of time in cold and dark interior locations. The present invention makes it possible to: produce a peroxotitanic acid solution containing vanadium and a tin compound from a titanium compound, a vanadium compound, a tin compound, a basic substance, hydrogen peroxide, and an aqueous dispersion medium as starting materials; subject the peroxotitanic acid solution to a hydrothermal reaction under high pressure; subsequently admix a copper compound into the acid solution; and obtain a visible-light-responsive titanium oxide microparticle dispersion or the like.

10 Claims, No Drawings

VISIBLE-LIGHT-RESPONSIVE TITANIUM OXIDE MICROPARTICLE DISPERSION, METHOD FOR MANUFACTURING SAME, AND MEMBER HAVING SURFICIAL PHOTOCATALYST THIN FILM FORMED USING SAME DISPERSION

TECHNICAL FIELD

This invention relates to a visible-light-responsive titanium oxide fine particle dispersion; a method for manufacturing the same; and a member having on its surface a photocatalyst thin film which is formed using the dispersion. More particularly, it relates to a visible-light-responsive titanium oxide fine particle dispersion which is improved in dispersion stability of titanium oxide fine particles during long-term storage in an indoor cold dark place and from which a highly transparent photocatalyst thin film capable of exerting photocatalytic activity in response to even visible light (400-800 nm) alone can be readily produced; a method for manufacturing the same; and a member having on its surface a photocatalyst thin film which is formed using the dispersion.

BACKGROUND ART

Titanium oxide finds use in a variety of applications, for example, pigments, UV screeners, catalysts, photocatalysts, catalyst carriers, adsorbents, ion exchangers, fillers, reinforcements, ceramic stock materials, precursors to complex oxides such as perovskite type complex oxides, and primers for magnetic tape.

Among others, photocatalytic titanium oxide fine powder is a material having photocatalytic activity upon exposure to light including UV light of 400 nm or shorter. The photocatalytic activity refers to the action that holes and electrons generate upon excitation by UV light of 400 nm or shorter, diffuse to a surface, and act on molecules adsorbed to that surface to undergo redox reactions. By the redox reactions, organic matter is decomposed when adsorbed to the titanium oxide surface.

Once titanium oxide fine particles having such photocatalytic activity are applied to the substrate surface to form a photocatalyst thin film, harmful organic materials adsorbed thereto can be decomposed by irradiating excitation light. They are often used in applications including cleaning of the substrate surface, deodorizing, and sterilization. It is required to increase the contact area of photocatalyst particles with a material to be decomposed for the purpose of enhancing photocatalytic activity, and film transparency is required for the purpose of preserving the aesthetic appearance of a substrate to be coated. To meet these requirements, titanium oxide fine particles in the titanium oxide dispersion must have an average particle size of not more than 50 nm.

Furthermore, titanium oxide exerts satisfactory photocatalytic activity upon exposure to light in the UV region of relatively short wavelength (wavelength 10 to 400 nm) in sunlight or the like, but is sometimes awkward to exert satisfactory photocatalytic activity in an indoor space with lighting from a light source mainly producing light in the visible region (wavelength 400 to 800 nm) such as fluorescent lamps. Recently, a tungsten oxide photocatalyst (Patent Document 1: JP-A 2009-148700) attracts attention as the visible-light-responsive photocatalyst. Since tungsten is a rare element, it is desired to enhance the visible light activity of a photocatalyst using a common element, titanium.

The general processes for preparing titanium oxide fine particles, which are industrially implemented, include the sulfate process using ilmenite ore or rutile ore and the chloride process (Non-Patent Document 1: Titanium Oxide, Gihodo Publishing Co.), as well as the hydrolysis/calcination process, reaction in organic solvents, and the solid phase process (Non-Patent Document 2: Standard Research of Photocatalysts, Tokyo Tosho Co.). The resulting titanium oxide fine particles are subjected to ultrafine dispersion treatment in a coating liquid in order that titanium oxide fine particles be coated onto the substrate surface while maintaining the aesthetic appearance of the substrate to be coated. The general fine dispersion treatments include, for example, methods of dispersing titanium oxide fine powder as synthesized in dispersing media with the aid of dispersing agents such as organic dispersants by a wet dispersing machine (Patent Document 2: JP-A H01-003020, Patent Document 3: JP-A H06-279725, Patent Document 4: JP-A H07-246119, Patent Document 5: JP-A 2004-182558), and methods of surface-treating titanium oxide so that it may be dispersed in dispersing media in a stable manner (Patent Document 6: JP-A 2005-170687, Patent Document 7: JP-A 2009-179497). However, these manufacturing methods have the problem that since ultrafine particles with an average particle size of not more than 50 nm are prone to agglomerate, a great deal of labor is necessary in order that even primary particles be dispersed, and in some cases, it is impossible to disperse even primary particles; and the problem that when particles are surface-treated with inorganic or organic components or when dispersing agents such as surfactants are added, both for the purpose of enhancing dispersion stability, the photocatalyst is surface coated therewith, which becomes a factor of inhibiting the photocatalyst from exerting activity.

Also disclosed are the method of preparing an anatase type titanium oxide dispersion having long-term stability by hydrothermal treatment of a peroxotitanic acid solution obtained by dissolving titanium hydroxide with the aid of hydrogen peroxide (Patent Document 8: JP-A H10-67516); the method of preparing rutile type titanium oxide sol (Patent Document 9: JP-A H02-255532); and the method of preparing titanium oxide sol (Patent Document 10: JP-A H10-182152). In these dispersions, titanium oxide fine particles are kept dispersed without a need for surface treatment or dispersing agents while the average particle size is not more than 50 nm. Photocatalytic coating films obtained by coating substrates with the dispersions exhibit high transparency and activity upon UV light exposure, but not sufficient visible light activity.

SUMMARY OF INVENTION

Technical Problem

An object of the invention, which has been made under the above-mentioned circumstances, is to provide a visible-light-responsive titanium oxide fine particle dispersion which is improved in long-term dispersion stability of titanium oxide fine particles without a need for addition of organic dispersing agents or surfactants which become the inhibitory factor against photocatalytic activity development, or surface treatment of titanium oxide particles, and from which a highly transparent photocatalyst thin film capable of exerting photocatalytic activity in response to even visible light (400-800 nm) alone can be readily produced; a method for manufacturing the same; and a member having on its surface a photocatalyst thin film which is formed using the dispersion.

Solution to Problem

Making extensive investigations to attain the above objects, the inventors have found that a visible-light-responsive titanium oxide fine particle dispersion comprising titanium oxide fine particles containing a peroxotitanium component, a vanadium component, and a tin component dispersed in an aqueous dispersing medium, and further comprising a copper component is useful; that the dispersion is manufactured by providing a precursor titanium compound, a vanadium compound, a tin compound, a basic substance, hydrogen peroxide, and an aqueous dispersing medium to form a peroxotitanic acid solution containing the vanadium and tin compounds, subjecting the peroxotitanic acid solution to hydrothermal reaction under high pressure, and mixing the resulting dispersion with a copper compound, thereby yielding a titanium oxide fine particle dispersion having dispersed therein titanium oxide fine particles containing a peroxotitanium component, a vanadium component, and a tin component, and comprising a copper component; and that this titanium oxide fine particle dispersion is improved in dispersion stability of titanium oxide fine particles during long-term storage in an indoor cold dark place and from which a highly transparent photocatalyst thin film capable of exerting photocatalytic activity in response to even visible light (400-800 nm) alone can be readily produced. The invention is predicated on this finding.

Also preferably a binder component is added in order to facilitate coating of the surface of various substrates with the titanium oxide fine particle dispersion and bonding of the fine particles. Although it is generally contemplated to use as the binder component, inorganic compounds, silicone resins, Teflon® resins and other resins which are least affected by photocatalytic activity, it has been found that for the visible-light-responsive titanium oxide fine particle dispersion of the invention, the use of silicon-based compounds is preferred from the standpoints of dispersion stability of titanium oxide fine particles, development of photocatalytic activity, transparency and durability of a photocatalyst thin film.

Accordingly, the invention provides a visible-light-responsive titanium oxide fine particle dispersion, a method for manufacturing the same, and a member having on its surface a photocatalyst thin film which is formed using the dispersion, as defined below.

[1] A visible-light-responsive titanium oxide fine particle dispersion comprising titanium oxide fine particles containing a peroxotitanium component, a vanadium component, and a tin component dispersed in an aqueous dispersing medium, and further comprising a copper component.

[2] The visible-light-responsive titanium oxide fine particle dispersion of [1] wherein the vanadium component is present in such an amount relative to the titanium oxide as to give a molar ratio (Ti/V) in a range from 100 to 10,000.

[3] The visible-light-responsive titanium oxide fine particle dispersion of [1] or [2] wherein the peroxotitanium component is present in an amount of 0.05 to 2% by weight based on the titanium oxide.

[4] The visible-light-responsive titanium oxide fine particle dispersion of any one of [1] to [3] wherein the tin component is present in such an amount relative to the titanium oxide as to give a molar ratio (Ti/Sn) in a range from 10 to 1,000.

[5] The visible-light-responsive titanium oxide fine particle dispersion of any one of [1] to [4] wherein the copper component is present in an amount of 0.01 to 1% by weight based on the titanium oxide, when calculated as metallic copper.

[6] The visible-light-responsive titanium oxide fine particle dispersion of any one of [1] to [5] wherein the visible-light-responsive titanium oxide fine particles have a size as dispersed of 5 to 30 nm when expressed by a 50% by volume cumulative distribution diameter (DJ measured by the dynamic scattering method using laser light.

[7] The visible-light-responsive titanium oxide fine particle dispersion of any one of [1] to [6], further comprising a binder.

[8] The visible-light-responsive titanium oxide fine particle dispersion of [7] wherein the binder is a silicon compound-based binder.

[9] A member having on its surface a photocatalyst thin film which is formed using the visible-light-responsive titanium oxide fine particle dispersion of any one of [1] to [8].

[10] A method for manufacturing the visible-light-responsive titanium oxide fine particle dispersion of any one of [1] to [6], comprising the steps of:

(1) providing a precursor titanium compound, a vanadium compound, a tin compound, a basic substance, hydrogen peroxide, and an aqueous dispersing medium to form a peroxotitanic acid solution containing the vanadium and tin compounds, (2) heating the peroxotitanic acid solution containing the vanadium and tin compounds at 80 to 250° C. under high pressure to form a titanium oxide fine particle dispersion containing a peroxotitanium component, vanadium component, and tin component, and (3) mixing the titanium oxide fine particle dispersion with a copper compound.

[11] The method of [10], further comprising the step of adding a binder subsequent to step (3).

[12] The method of [11] wherein the binder is a silicon compound-based binder.

[13] A member having on its surface a photocatalyst thin film which is formed using the visible-light-responsive titanium oxide fine particle dispersion manufactured by the method of any one of [10] to [12].

Advantageous Effects of Invention

According to the invention, there are provided a visible-light-responsive titanium oxide fine particle dispersion which is improved in dispersion stability of titanium oxide fine particles during long-term storage in an indoor cold dark place and from which a highly transparent photocatalyst thin film capable of exerting photocatalytic activity in response to even visible light (400-800 nm) alone can be readily produced; a method for manufacturing the same; and a member having on its surface a photocatalyst thin film which is formed using the dispersion.

DESCRIPTION OF EMBODIMENTS

Now the invention is described in detail.

<Method for Manufacturing Visible-Light-Responsive Titanium Oxide Fine Particle Dispersion>

The method for manufacturing a visible-light-responsive titanium oxide fine particle dispersion according to the invention comprises the steps of:

(1) providing a precursor titanium compound, a vanadium compound, a tin compound, a basic substance, hydrogen peroxide, and an aqueous dispersing medium to form a peroxotitanic acid solution containing the vanadium and tin compounds, (2) heating the peroxotitanic acid solution containing the vanadium and tin compounds from step (1) at 80 to 250° C. under high pressure to form a titanium oxide fine particle dispersion containing a peroxotitanium component, vanadium component, and tin component, and (3) mixing the titanium oxide fine particle dispersion from step (2) with a copper compound.

Step (1)

Step (1) is to react a precursor titanium compound, a vanadium compound, a tin compound, a basic substance, and hydrogen peroxide in an aqueous dispersing medium, to form a peroxotitanic acid solution containing the vanadium and tin compounds.

The reaction mode may be either by adding a basic substance to a precursor titanium compound in an aqueous dispersing medium to convert it to titanium hydroxide, removing impurity ions other than the metal ions contained therein, adding hydrogen peroxide thereto to form peroxotitanic acid, thereafter adding a vanadium compound and a tin compound, to form vanadium/tin-containing peroxotitanic acid; or by adding a vanadium compound and a tin compound to a precursor titanium compound in an aqueous dispersing medium, then adding a basic substance thereto to form vanadium/tin-containing titanium hydroxide, removing impurity ions other than the metal ions contained therein, and adding hydrogen peroxide thereto to form vanadium/tin-containing peroxotitanic acid.

Examples of the precursor titanium compound used herein include salts of titanium with mineral acids such as hydrochloric acid, nitric acid, and sulfuric acid, salts of titanium with organic acids such as formic acid, citric acid, oxalic acid, lactic acid and glycolic acid, and titanium hydroxide obtained by adding an alkali to an aqueous solution of such salt and allowing for hydrolysis and precipitation, which may be used alone or in admixture of two or more.

The aqueous dispersing medium serves to form an aqueous solution of the precursor titanium compound, and an aqueous solvent is typically used. Typical of the aqueous solvent are water and a mixture of water and a hydrophilic organic solvent in an arbitrary ratio. Preferably the water is, for example, deionized water, distilled water, pure water or the like. Preferred examples of the hydrophilic organic solvent include alcohols such as methanol, ethanol and isopropanol. In this embodiment, the hydrophilic organic solvent is preferably admixed in a proportion of 0 to 50% by weight of the aqueous dispersing medium. Among others, pure water is most preferred for productivity and cost.

The precursor titanium compound and the aqueous dispersing medium form a precursor titanium compound aqueous solution which preferably has a concentration of up to 60% by weight, more preferably up to 30% by weight. Notably, the lower limit of concentration may be selected as appropriate, although a concentration of at least 1% by weight is preferred.

The basic substance serves to smoothly convert the precursor titanium compound to titanium hydroxide and to stabilize the peroxotitanium component (to be described below) in the aqueous dispersing medium, and examples include hydroxides of alkali and alkaline earth metals such as sodium hydroxide and potassium hydroxide, and amine compounds such as ammonia, alkanol amines and alkyl amines. It is added and used in such an amount as to keep the precursor titanium compound aqueous solution at pH 7 or higher, especially pH 7 to 10.

The basic substance may also be used as an aqueous solution of a suitable concentration along with the aqueous dispersing medium.

The vanadium compound serves to enhance the visible light response of the photocatalyst: thin film. Examples include metallic form, oxide, hydroxide, nitrate, sulfate, halides and complex compounds of vanadium, which may be used alone or in admixture of two or more.

The vanadium compound is preferably contained in such an amount relative to the titanium oxide as to give a molar ratio (Ti/V) in a range from 100 to 10,000, more preferably 500 to 10,000, and even more preferably 1,000 to 5,000. If the molar ratio is less than 100, the proportion of crystalline titanium oxide may become lower, failing to fully exert the photocatalytic effect. If the molar ratio exceeds 10,000, the visible light response may be insufficient.

It is noted that the vanadium component is preferably present in such a state that titanium oxide fine particles may be doped with at least a portion thereof, or at least a portion thereof may be adsorbed to the surface of titanium oxide fine particles while the remaining portion be dissolved and/or dispersed in the dispersion.

The tin compound serves to enhance the visible light response of the photocatalyst thin film. Examples include metallic form, oxide, hydroxide, nitrate, sulfate, halides and complex compounds of tin, which may be used alone or in admixture of two or more.

The tin compound is preferably contained in such an amount relative to the titanium oxide as to give a molar ratio (Ti/Sn) in a range from 10 to 1,000, more preferably 10 to 500, and even more preferably 20 to 100. If the molar ratio is less than 10, the proportion of titanium oxide may become lower, failing to fully exert the photocatalytic effect. If the molar ratio exceeds 1,000, the visible light response may be insufficient.

It is noted that the tin component is preferably present in such a state that titanium oxide fine particles may be doped with at least a portion thereof, or at least a portion thereof may be adsorbed to the surface of titanium oxide fine particles while the remaining portion be dissolved and/or dispersed in the dispersion.

Hydrogen peroxide serves to convert the precursor titanium compound or titanium hydroxide to peroxotitanium, that is, a titanium oxide compound having Ti—O—O—Ti linkage, and is typically used in the form of aqueous hydrogen peroxide.

Hydrogen peroxide is preferably added in a molar amount of 1.5 to 10 times to the total moles of Ti, V and Sn. When the reaction to convert the precursor titanium compound or titanium hydroxide to peroxotitanic acid takes place as a result of hydrogen peroxide being added, the reaction temperature is preferably in a range of 5 to 60° C. and the reaction time is preferably in a range of 30 minutes to 24 hours.

In this way, there is obtained a peroxotitanic acid solution containing the vanadium and tin compounds, which may contain an alkaline or acidic substance for pH adjustment or other purposes.

As used herein, examples of the alkaline substance include ammonia, sodium hydroxide, and calcium hydroxide; and examples of the acidic substance include mineral acids such as sulfuric acid, nitric acid, hydrochloric acid, carbonic acid, phosphoric acid and hydrogen peroxide, and organic acids such as formic acid, citric acid, oxalic acid, lactic acid and glycolic acid.

It is preferred for safety of handling that the peroxotitanic acid solution containing the vanadium and tin compounds is at pH 1 to 7, especially pH 4 to 7.

Step (2)

In step (2), the vanadium/tin-containing peroxotitanic acid solution resulting from step (1) is subjected to hydrothermal reaction at a temperature of 80 to 250° C., preferably 100 to 250° C. under high pressure. From the standpoints of reaction efficiency and reaction control, an appropriate reaction temperature is 80 to 250° C. As a result, the vanadium/tin-containing peroxotitanic acid is converted into titanium oxide fine particles containing peroxotitanium, vanadium and tin.

In this step, the pressure is preferably as high as about 0.01 to 4.5 MPa, more preferably about 0.15 to 4.5 MPa. The reaction time is preferably 1 minute to 24 hours.

From step (2), there is obtained a dispersion of titanium oxide fine particles containing peroxotitanium, vanadium and tin components.

As used herein, the peroxotitanium component refers to a titanium oxide compound having Ti—O—O—Ti linkage, and encompasses peroxotitanic acid and a peroxotitanium complex produced by reaction of Ti(Vi) with hydrogen peroxide.

The vanadium component refers to a vanadium base compound inclusive of metallic vanadium, and encompasses the above-mentioned vanadium compounds.

The tin component refers to a tin base compound inclusive of metallic tin, and encompasses the above-mentioned tin compounds.

Step (3)

In step (3), the titanium oxide fine particle dispersion resulting from step (2) is mixed with a copper compound.

The mixing mode may be by adding a copper compound to the titanium oxide fine particle dispersion, and agitating by an agitating machine, or dispersing by an ultrasonic dispersing machine. Preferably the temperature during mixing is 20 to 250° C. and the time is 1 minute to 3 hours.

Further, it is preferred for ease of handling that the temperature be 20 to 60° C. and the time be 1 minute to 1 hour.

The copper compound used herein serves to enhance the decomposition activity of the photocatalyst thin film. Examples include salts of copper with mineral acids such as hydrochloric acid, nitric acid and sulfuric acid, salts of copper with organic acids such as formic acid, citric acid, oxalic acid, lactic acid and glycolic acid, copper hydroxide obtained by adding an alkali to an aqueous solution of such salt and allowing for hydrolysis and precipitation, and complexes such as copper-tetraamine complexes, which may be used alone or in admixture of two or more.

The copper compound may also be used as an aqueous solution of a suitable concentration along with the aqueous dispersing medium.

The copper compound is preferably contained in an amount of 0.01 to 1% by weight, more preferably 0.1 to 1% by weight of metallic copper, based the titanium oxide fine particles. If the content is less than 0.01 wt. % or more than 1 wt %, the photocatalyst thin film may not exert fully the decomposition activity or the copper compound may not be fully mixed or dispersed, resulting in the photocatalyst thin film losing transparency.

Preferably the copper component is present in a state that it is dispersed and/or dissolved in the dispersion.

Through steps (1) to (3) as mentioned above, there is obtained a visible-light-responsive titanium oxide fine particle dispersion comprising titanium oxide fine particles containing a peroxotitanium component, a vanadium component, and a tin component dispersed in an aqueous dispersing medium, and further comprising a copper component. Preferably the titanium oxide fine particles in the dispersion have a 50% by volume cumulative distribution diameter ($D_{50}$) (referred to as "average particle size", hereinafter) of 5 to 30 nm as measured by the dynamic scattering method using laser light. The average particle size is more preferably 5 to 20 nm, and even more preferably 5 to 15 nm.

From the standpoint of ease of fabrication of a photocatalyst thin film having a given thickness, the concentration of titanium oxide fine particles in the dispersion is preferably 0.01 to 20% by weight, more preferably 0.5 to 10% by weight based on the dispersion.

The peroxotitanium component contained in the dispersion functions to facilitate dispersion of titanium oxide. The concentration of peroxotitanium component is 0.05 to 2% by weight, preferably 0.05 to 1% by weight of the titanium oxide fine particles. If the concentration is less than 0.05% by weight, titanium oxide fine particles may be prone to agglomerate. If the concentration exceeds 2% by weight, the photocatalyst thin film obtained from the dispersion may have insufficient photocatalytic effect.

Preferably the peroxotitanium component is distributed in such a state that at least a portion thereof may be present within the interior or on the surface of titanium oxide fine particles while the remaining portion be dissolved and/or dispersed in the dispersion.

The visible-light-responsive titanium oxide fine particle dispersion thus obtained is improved in dispersion stability of titanium oxide fine particles during long-term storage in an indoor cold dark place.

As used herein, the term "cold dark place" refers to a cold place kept at about 10 to 25° C. and a dark place shaded from direct sunlight or direct light from indoor luminaries, and examples of the cold dark place are refrigerators, chemicals storages, underground storerooms and the like.

The visible-light-responsive titanium oxide fine particle dispersion of the invention is significantly improved in dispersion stability of titanium oxide fine particles in that when held in an indoor cold dark place, even over about 6 months, the dispersion is effective for preventing the average particle size of titanium oxide fine particles from gaining an increase of more than 30% of the initial size of particles as prepared.

<Member Having Photocatalyst Thin Film on Surface>

The visible-light-responsive titanium oxide fine particle dispersion of the invention may be used to form a photocatalyst thin film on the surface of various members.

The member used herein is not particularly limited, and examples of the material of which the member is made include organic and inorganic materials, with the inorganic materials including non-metallic inorganic materials and metallic inorganic materials. These materials may have any desired shape depending on a particular purpose and application.

Examples of the organic material include synthetic resins such as vinyl chloride resins (PVC), polyethylene (PE), polypropylene (PP), polycarbonate (PC), acrylic resins, polyacetal, fluoro-resins, silicone resins, ethylene-vinyl acetate copolymers (EVA), acrylonitrile-butadiene rubber (NBR), polyethylene terephthalate (PET), polyethylene naphthalate (PEN), polyvinyl butyral (PVB), ethylene-vinyl alcohol copolymers (EVOH), polyimide resins, polyphenylene sulfide (PPS), polyether imide (PEI), polyether imide (PEEI), polyether ether ketone (PEEK), melamine resins, phenolic resins, acrylonitrile-butadiene-styrene (ABS) resins; naturally occurring materials such as natural rubber; and semi-synthetic materials of the foregoing synthetic resin materials and naturally occurring materials.

These materials may be processed into products of a predetermined shape or structure such as film, sheet, textile materials, textile products, otherwise shaped parts, and laminates.

Examples of the non-metallic inorganic materials include glass, ceramics, and stone. These materials may be processed into products of a suitable shape such as tiles, glass plates, mirrors, wall members, and decorative members.

Examples of the metallic inorganic materials include cast iron, steel, iron, iron alloys, aluminum, aluminum alloys, nickel, nickel alloys, and die cast zinc. These metallic materials may be plated with the metallic inorganic materials or coated with the organic materials, or be a plating applied to the surface of the organic materials or non-metallic inorganic materials.

Among a variety of members mentioned above, the visible-light-responsive titanium oxide fine particle dispersion of the invention is especially useful in forming a transparent photocatalyst thin film on a polymer sheet such as PET.

In one exemplary method for forming a photocatalyst film on the surface of a member, for example, the visible-light-responsive titanium oxide fine particle dispersion may be applied to the member surface by any well-known coating techniques such as spray coating and dip coating, and the coating is dried by any well-known drying techniques such as far-infrared drying, IH drying and hot air drying. While the thickness of the photocatalyst film may vary over a wide range, a range of 50 nm to 10 μm is preferred in most cases.

It is noted that a binder may be added to the visible-light-responsive titanium oxide fine particle dispersion for the purposes of facilitating application of the dispersion to the member surface and bonding of fine particles to the member surface. Specifically a silicon compound-based binder is added in such amounts that the weight ratio of silicon compound to titanium oxide may range from 1:99 to 99:1, more preferably from 10:90 to 90:10, and even more preferably from 30:70 to 70:30.

The silicon compound-based binder used herein refers to a colloidal dispersion, solution or emulsion containing a solid or liquid silicon compound in an aqueous dispersing medium. Examples include colloidal silica, solutions of silicic acid salts such as silicates, emulsions of silane or siloxane hydrolyzates, silicone resin emulsions, and emulsions of copolymers of silicone resins with other resins such as silicone-acrylic resin copolymers and silicone-urethane resin copolymers.

The photocatalyst film thus formed is transparent, exhibits satisfactory photocatalytic effect not only in response to light of the LV region (10 to 400 nm) as in the prior art, but also in response to light of the visible region (400 to 800 nm) alone to which prior art photocatalysts fail to exert satisfactory photocatalytic effect. The member having the photocatalyst film formed thereon is effective for cleaning of the member surface, deodorizing and sterilization because any organic matter adsorbed to the member surface can be decomposed by the photocatalytic action of titanium oxide.

EXAMPLES

Examples and Comparative Examples are given below by way of illustration although the invention is not limited thereto. Notably, measurements were carried out as follows.
(1) Average Particle Size ($D_{50}$) of Titanium Oxide Fine Particles in Dispersion Average particle size ($D_{50}$) of titanium oxide fine particles in a dispersion was measured using a particle size distribution measuring system (trade name "Nanotrac particle size analyzer UPA-EX" by Nikkiso Co., Ltd.).
(2) Stability of Visible-Light-Responsive Titanium Oxide Fine Particle Dispersion The dispersion stability of titanium oxide fine particles in a visible-light-responsive titanium oxide fine particle dispersion is examined by using the particle size distribution measuring system and comparing the average particle size on the date of preparation with the average particle size after stationary storage in an indoor cold dark place for 6 months, and rated according to the following criterion.
  Good (expressed by ○): difference≤30%
  Fair (expressed by Δ): +30%<difference≤50%
  Poor (expressed by x): difference>+50% or particles settled on container bottom
(3) Presence of Peroxotitanium Component in Titanium Oxide Fine Particles The presence of peroxotitanium component in titanium oxide fine particles was confirmed by detecting an O—O bond in a peroxo group. Specifically, the titanium oxide fine particle dispersion prepared was dried in air at room temperature, yielding a powder of titanium oxide fine particles. On analysis of the powder by an IR spectrophotometer (trade name "System 2000" by PerkinElmer Inc.), the appearance of a peak of O—O bond near 900 $cm^{-1}$ was observed.
(4) Concentration of Peroxotitanium Component in Titanium Oxide Fine Particle Dispersion The concentration of peroxotitanium component in a titanium oxide fine particle dispersion was measured by the hydrogen peroxide absorptiometry. Specifically, the titanium oxide fine particle dispersion was made acidic with sulfuric acid, which was reacted with the peroxotitanium component to develop color. Using a UV/Vis/NIR spectrophotometer (trade name "Lambda 950" by PerkinElmer Inc.), the intensity at wavelength 410 nm was measured, from which a relative intensity to the Ti standard solution was computed.
(5) Transparency of Photocatalyst Thin Film A glass plate as the substrate was measured for a haze value (%). Next, the dispersion was coated onto the glass plate and dried to form a photocatalyst thin film. The glass plate having the thin film thereon was measured for a haze value. The haze value of the thin film was computed from the difference. For haze value measurement, a haze meter (trade name "Digital Haze Meter NDH-200" by Nippon Denshoku Co., to Ltd.) was used. The transparency of a photocatalyst thin film was evaluated according to the following criterion in terms of the difference between haze values.
  Good (expressed by ○): difference≤1%
  Fair (expressed by Δ): +1%<difference≤3%
  Poor (expressed by x): difference>+3%
(6) Acetaldehyde Gas Decomposition. Test of Photocatalyst Thin Film (Under LED Illumination)

A photocatalyst thin film prepared by coating and drying the dispersion was evaluated for activity in terms of decomposition reaction of acetaldehyde gas. The evaluation is by a batchwise gas decomposition performance test.

Specifically, in a 5-L volume stainless steel cell with a Quartz glass window, a test sample having a 50-mg photocatalyst thin film formed on a A4-size PET sheet was placed. The cell was filled with an acetaldehyde gas having a concentration of 5 ppm and conditioned to a humidity of 50%. An LED unit (trade name "TH-211x200SW", CCS Inc., spectral band 400-800 nm) installed above the cell was operated to irradiate light at an illuminance of 30,000 lx. As the acetaldehyde gas was decomposed with the aid of the photocatalyst on the thin film, the concentration of acetaldehyde gas in the cell decreased. By measuring the concentration, the amount of acetaldehyde gas decomposed could be determined. The acetaldehyde gas concentration was measured by a photoacoustic multi-gas monitor (trade name "INNOVA 1412", LumaSense Technologies Inc.). Evaluation was made by comparing the concentration of residual acetaldehyde gas after 12 hours of irradiation.

Example 1

To a 36 wt % titanium(IV) chloride aqueous solution, vanadyl(IV) sulfate was added so as to provide a Ti/V molar ratio of 2,000 and tin(IV) chloride was added so as to provide a Ti/Sn molar ratio of 20. The solution was diluted 10 times with pure water. To the aqueous solution, 10 wt % aqueous ammonia was gradually added so that: neutralization and hydrolysis might take place, yielding a precipitate of titanium hydroxide containing vanadium and tin. At this point, the solution was at pH 8. The resulting titanium hydroxide precipitate was deionized by repeating pure water addition and decantation. To the vanadium/tin-containing titanium hydroxide precipitate as deionization treated, 30 wt % aqueous hydrogen peroxide was added so as to provide a hydrogen peroxide/titanium hydroxide molar ratio of at least 2.5. Subsequent stirring at room temperature for 24 hours allowed for thorough reaction. Thereafter, pure water was added for concentration adjustment, yielding a yellow clear solution (a) of vanadium/tin-containing peroxotitanic acid (solids concentration 1 wt %).

A 500-mL volume autoclave was charged with 400 mL of peroxotitanic acid solution (a), which was subjected to hydrothermal treatment under conditions: 120° C. and 0.2 MPa for 240 minutes. Thereafter, the reaction mixture in the autoclave was transferred through a sampling tube to a container kept in a water bath at 25° C. The reaction was quenched by this quick cooling, obtaining a titanium oxide fine particle dispersion (A).

The titanium oxide fine particle dispersion was dried at room temperature until a powder was obtained. The powder was analyzed by an infrared spectrophotometer, observing a peak of O—O bond in peroxo group near 900 $cm^{-1}$.

Sulfuric acid was added to titanium oxide fine particle dispersion (A) whereby the peroxotitanium component was colored orange. Absorption of this color was measured by a UV/Vis/NIR spectrophotometer, and the concentration of peroxotitanium component was determined to be 0.32%, using the calibration curve previously obtained from Ti standard solution.

Copper(II) sulfate was dissolved in pure water to form a 1 wt % copper sulfate aqueous solution (i).

The 1 wt. % copper sulfate aqueous solution (i) was added to titanium oxide fine particle dispersion (A) so as to provide 0.10 wt % of metallic copper based on titanium oxide, which was milled by an agitating machine, obtaining a visible-light-responsive titanium oxide fine particle dispersion (α) within the scope of the invention. The titanium oxide fine particles in the dispersion had an average particle size of 11 nm. The titanium oxide fine particle dispersion was held in an indoor cold dark place for 6 months, after which the average particle size was 12 nm (good: ○).

A test coating liquid was prepared by adding a silica-based binder (colloidal silica, trade name Snowtex 20 by Nissan Chemical Industries Ltd.) to titanium oxide fine particle dispersion (μ) so as to provide a $TiO_2/SiO_2$ weight ratio of 1.5.

The test coating liquid was coated onto a glass plate by a dip coater and dried to form a photocatalyst thin film of 150 nm thick, obtaining a test sample. On haze measurement by a haze meter, the difference in haze between the glass plate as substrate and the photocatalyst-coated glass plate was 0.5% (good: ○).

The test coating liquid was coated onto an A4-size PET sheet by a #7 wire bar coater so as to form a photocatalyst thin film of 50 mg, obtaining a sample for the acetaldehyde gas decomposition performance test. A percent gas decomposition of this photocatalyst thin film was measured by the batchwise gas decomposition performance test, finding a gas decomposition of 58% after 12 hours of LED illumination.

Example 2

To a 60 wt % titanyl (IV) sulfate aqueous solution, vanadium(V) oxytrichloride was added so as to provide a Ti/V molar ratio of 200 and potassium stannate(IV) was added so as to provide a Ti/Sn molar ratio of 20. The solution was diluted 10 times with pure water. To the aqueous solution, 10 wt % aqueous ammonia was gradually added so that neutralization and hydrolysis might take place, yielding a precipitate of titanium hydroxide containing vanadium and tin. At this point, the solution was at pH 8.5. The resulting titanium hydroxide precipitate was deionized by repeating pure water addition and decantation. To the vanadium/tin-containing titanium hydroxide precipitate as deionization treated, 30 wt % aqueous hydrogen peroxide was added so as to provide a hydrogen peroxide/titanium hydroxide molar ratio of at least 3. Subsequent stirring at room temperature for 24 hours allowed for thorough reaction. Thereafter, pure water was added for concentration adjustment, yielding a yellow clear solution (b) of vanadium/tin-containing peroxotitanic acid (solids concentration 1 wt %).

A 500-mL volume autoclave was charged with 400 mL of peroxotitanic acid solution (b), which was subjected to hydrothermal treatment under conditions: 180° C. and 1.1 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (B).

The titanium oxide fine particle dispersion (B) was dried at room temperature until a powder was obtained. The powder was analyzed by an infrared spectrophotometer, observing a peak of O—O bond in peroxo group near 900 $cm^{-1}$.

Sulfuric acid was added to titanium oxide fine particle dispersion (B) whereby the peroxotitanium component was colored orange. Absorption of this color was measured by a UV/Vis/NIR spectrophotometer, and the concentration of peroxotitanium component was determined to be 0.26%, using the calibration curve previously obtained from Ti standard solution.

Copper sulfate aqueous solution (i) was added to titanium oxide fine particle dispersion (B) so as to provide 0.10 wt % of metallic copper based on titanium oxide, which was milled by an agitating machine, obtaining a visible-light-responsive titanium oxide fine particle dispersion (β) within the scope of the invention. The titanium oxide fine particles in the dispersion had an average particle size of 10 nm. After the titanium oxide fine particle dispersion was held in an indoor cold dark place for 6 months, the average particle size was 12 nm (good: ○).

Thereafter, as in Example 1, a test coating liquid was prepared from titanium oxide fine particle dispersion (β) and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.5% (good: ○) and the gas decomposition was 33%.

Example 3

A visible-light-responsive titanium oxide fine particle dispersion (γ) within the scope of the invention was prepared as in Example 1 except that tin(IV) chloride was added so as to provide a Ti/Sn molar ratio of 500. The titanium oxide fine particles in the dispersion had an average particle size of 15 nm. After the titanium oxide fine particle dispersion was held in an indoor cold dark place for 6 months, the average particle size was 17 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 0.12%.

Thereafter, as in Example 1, a test coating liquid was prepared from titanium oxide fine particle dispersion (γ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.7% (good: ○) and the gas decomposition was 28%.

Example 4

A visible-light-responsive titanium oxide fine particle dispersion (δ) within the scope of the invention was prepared as in Example 1 except that copper sulfate aqueous solution (i) was added to titanium oxide fine particle dispersion (A) so as to provide 0.5 wt % of metallic copper. The titanium oxide fine particles in the dispersion had an average particle size of 11 nm. After the titanium oxide fine particle dispersion was held in an indoor cold dark place for 6 months, the average particle size was 12 nm (good: ○).

Thereafter, as in Example 1, a test coating liquid was prepared from titanium oxide fine particle dispersion (δ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.4% (good: ○) and the gas decomposition was 48%.

Example 5

A visible-light-responsive titanium oxide fine particle dispersion (ε) within the scope of the invention was prepared as in Example 1 except that the hydrothermal treatment time was 150 minutes. The titanium oxide fine particles in the dispersion had an average particle size of 9 nm. After the titanium oxide fine particle dispersion was held in an indoor cold dark place for 6 months, the average particle size was 11 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 1.20%.

Thereafter, as in Example 1, a test coating liquid was prepared from titanium oxide fine particle dispersion (δ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.4% (good: ○) and the gas decomposition was 40%.

Comparative Example 1

A titanium oxide fine particle dispersion (ζ) was prepared as in Example 1 except that tin(IV) chloride was omitted. The titanium oxide fine particles in the dispersion had an average particle size of 27 nm. After the titanium oxide fine particle dispersion was held in an indoor cold dark place for 6 months, the average particle size was 30 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 0.09%.

Thereafter, as in Example 1, a test coating liquid was prepared from titanium oxide fine particle dispersion (ζ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 1.0% (good: ○) and the gas decomposition was 3%.

Comparative Example 2

A titanium oxide fine particle dispersion (η) was prepared as in Example 2 except that vanadium(V) oxytrichloride was omitted. The titanium oxide fine particles in the dispersion had an average particle size of 12 nm. After the titanium oxide fine particle dispersion was held in an indoor cold dark place for 6 months, the average particle size was 14 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 0.29%.

Thereafter, as in Example 1, a test coating liquid was prepared from titanium oxide fine particle dispersion (η); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.5% (good: ○) and the gas decomposition was 0%.

Comparative Example 3

A titanium oxide fine particle dispersion (θ) was prepared as in Example 2 except that vanadium(V) oxytrichloride was added so as to provide a Ti/V molar ratio of 10. The titanium oxide fine particles in the dispersion had an average particle size of 3 nm. After the titanium oxide fine particle dispersion was held in an indoor cold dark place for 6 months, the average particle size was 3 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 0.30%.

Thereafter, as in Example 1, a test coating liquid was prepared from titanium oxide fine particle dispersion (θ) and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.2% (good: ○) and the gas decomposition was 0%.

Comparative Example 4

A titanium oxide fine particle dispersion (ι) was prepared as in Example 2 except that vanadium(V) oxytrichloride was added so as to provide a Ti/V molar ratio of 50,000. The titanium oxide fine particles in the dispersion had an average particle size of 12 nm. After the titanium oxide fine particle dispersion was held in an indoor cold dark place for 6 months, the average particle size was 14 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 0.31%.

Thereafter, as in Example 1, a test coating liquid was prepared from titanium oxide fine particle dispersion (ι); and using the test coating liquid, a photocatalyst thin film was determined for transparency (difference in haze between glass plate as substrate and photocatalyst-coated glass plate) and acetaldehyde gas decomposition performance (percent gas decomposition). The have difference was 0.5% (good: ○) and the gas decomposition was 1%.

Comparative Example 5

A titanium oxide fine particle dispersion (κ) was prepared as in Example 1 except that tin(IV) chloride was added so as to provide a Ti/Sn molar ratio of 1. The titanium oxide fine particles in the dispersion had an average particle size of 4 nm. After the titanium oxide fine particle dispersion was held in an indoor cold dark place for 6 months, the average particle size was 4 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 1.05%.

Thereafter, as in Example 1, a test coating liquid was prepared from titanium oxide fine particle dispersion (κ); and using the test coating liquid, a photocatalyst thin film was determined for transparency (difference in haze between glass plate as substrate and photocatalyst-coated glass plate) and acetaldehyde gas decomposition performance (percent gas decomposition). The have difference was 0.3% (good: ○) and the gas decomposition was 6%.

Comparative Example 6

A titanium oxide fine particle dispersion (λ) was prepared as in Example 1 except that tin(IV) chloride was added so as to provide a Ti/Sn molar ratio of 5,000. The titanium oxide fine particles in the dispersion had an average particle size of 25 nm. After the titanium oxide fine particle dispersion was held in an indoor cold dark place for 6 months, the average particle size was 29 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 0.05%.

Thereafter, as in Example 1, a test coating liquid was prepared from titanium oxide fine particle dispersion (λ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.7% (good: ○) and the gas decomposition was 4%.

Comparative Example 7

A titanium oxide fine particle dispersion (μ) was prepared as in Example 1 except that copper sulfate aqueous solution (i) was omitted. The titanium oxide fine particles in the dispersion had an average particle size of 11 nm. After the titanium oxide fine particle dispersion was held in an indoor cold dark place for 6 months, the average particle size was 12 nm (good: ○).

Thereafter, as in Example 1, a test coating liquid was prepared from titanium oxide fine particle dispersion (μ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.5% (good: ○) and the gas decomposition was 2%.

Comparative Example 8

A titanium oxide fine particle dispersion (ν) was prepared as in Example 1 except that copper sulfate aqueous solution (i) was added to titanium oxide fine particle dispersion (A) so as to provide 0.001 wt % of metallic copper based on titanium oxide. The titanium oxide fine particles in the dispersion had an average particle size of 11 nm. After the titanium oxide fine particle dispersion was held in an indoor cold dark place for 6 months, the average particle size was 13 nm (good: ○).

Thereafter, as in Example 1, a test coating liquid was prepared from titanium oxide fine particle dispersion (ν) and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 0.3% (good: ○) and the gas decomposition was 8%.

Comparative Example 9

A titanium oxide fine particle dispersion (ξ) was prepared as in Example 1 except that copper sulfate aqueous solution (i) was added to titanium oxide fine particle dispersion (A) so as to provide 5.0 wt % of metallic copper based on titanium oxide. The titanium oxide fine particles in the dispersion had an average particle size of 15 nm. After the titanium oxide fine particle dispersion was held in an indoor cold dark place for 6 months, the average particle size was 7 nm (good: ○).

Thereafter, as in Example 1, a test coating liquid was prepared from titanium oxide fine particle dispersion (ξ); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 7.2% (poor: x) and the gas decomposition was 0%.

Comparative Example 10

A titanium oxide fine particle dispersion (o) was prepared as in Example 1 except that the hydrothermal treatment time was 720 minutes. The titanium oxide fine particles in the dispersion had an average particle size of 85 nm. When the dispersion was held in an indoor cold dark place for 3 days, titanium oxide fine particles precipitated on the container bottom (poor: x).

Notably, at an intermediate stage after hydrothermal treatment and before addition of copper sulfate aqueous solution (i), titanium oxide fine particles in the titanium oxide fine particle dispersion were found to contain no peroxo group. The concentration of peroxotitanium component was 0.01%.

Thereafter, as in Example 1, a test coating liquid was prepared from titanium oxide fine particle dispersion (o); and using the test coating liquid, a photocatalyst thin film was determined for transparency (difference in haze between glass plate as substrate and photocatalyst-coated glass plate) and acetaldehyde gas decomposition performance (percent gas decomposition). The haze difference was 5.1% (poor: x) and the gas decomposition was 22%.

Comparative Example 11

A titanium oxide fine particle dispersion (t) was prepared as in Example 1 except that the hydrothermal treatment time was 60 minutes. The titanium oxide fine particles in the dispersion had an average particle size of 10 nm. After the titanium oxide fine particle dispersion was held in an indoor cold dark place for 6 months, the average particle size was 11 nm (good: ○).

Notably, at an intermediate stage after hydrothermal treatment and before addition of copper sulfate aqueous solution (i), titanium oxide fine particles in the titanium oxide fine particle dispersion were found to contain a peroxo group. The concentration of peroxotitanium component was 3.50%.

Thereafter, as in Example 1, a test coating liquid was prepared from titanium oxide fine particle dispersion (π); and using the test coating liquid, a photocatalyst thin film was determined for transparency (difference in haze between glass plate as substrate and photocatalyst-coated glass plate) and acetaldehyde decomposition performance (percent gas decomposition). The haze difference was 0.4% (good: ○) and the gas decomposition was 0%.

For the titanium oxide fine particles in Examples 1 to 5 and Comparative Examples 1 to 11, Table 1 tabulates the reaction conditions, average particle size, presence/absence and concentration of peroxotitanium component, as well as the stability of dispersion, transparency of photocatalyst thin film, and percent acetaldehyde gas decomposition after 12 hours of LED illumination in the acetaldehyde gas decomposition test.

As seen from the results of Comparative Examples 1, 5 and 6, no sufficient visible light activity is available if tin is not added, or if the amount of tin added is too small or too large.

As seen from the results of Comparative Examples 2, 3 and 4, no sufficient visible light activity is available if vanadium is not added, or if the amount of vanadium added is too small or too large.

As seen from the results of Comparative Examples 7, 8 and 9, no sufficient visible light activity is available if copper is not added, or if the amount of copper added is too small or too large.

As seen from the results of Comparative Example 10, if the amount of peroxotitanium component is too small, the dispersed state of titanium oxide fine particles in the titanium oxide dispersion is aggravated, failing to ensure stability for the dispersion and transparency for the photocatalyst film.

As seen from the results of Comparative Example 11, if too much peroxotitanium component is left, no sufficient visible light activity is available.

It is seen from the results of Examples 1 to 5 that when a predetermined amount of a copper compound is added to a titanium oxide fine particle dispersion containing predetermined amounts of peroxotitanium, vanadium and tin components, acetaldehyde gas decomposition (i.e., photocatalytic activity) is improved even under illumination from an LED lamp capable of producing only the visible spectrum of light.

TABLE 1

| | | Titanium oxide fine particle dispersion | Reactant molar ratio | | Amount of Cu added (%) | Hydrothermal treatment | | Test results | | | | | |
|---|---|---|---|---|---|---|---|---|---|---|---|---|---|
| | | | Ti/V | Ti/Sn | | Temp. (° C.) | Time (min) | Average particle size (nm) | Presence of peroxotitanium component | Concentration of peroxotitanium component (%) | Dispersion stability | Thin film transparency | Gas decomposition (%) |
| Example | 1 | (α) | 2,000 | 20 | 0.100 | 120 | 240 | 11 | ○ | 0.32 | ○ | ○ | 58 |
| | 2 | (β) | 200 | 20 | 0.100 | 180 | 180 | 10 | ○ | 0.26 | ○ | ○ | 33 |
| | 3 | (γ) | 2,000 | 500 | 0.100 | 120 | 240 | 15 | ○ | 0.12 | ○ | ○ | 28 |
| | 4 | (δ) | 2,000 | 20 | 0.500 | 120 | 240 | 11 | ○ | 0.32 | ○ | ○ | 48 |
| | 5 | (ε) | 2,000 | 20 | 0.100 | 120 | 150 | 9 | ○ | 1.20 | ○ | ○ | 40 |
| Comparative Example | 1 | (ζ) | 2,000 | 0 | 0.100 | 120 | 240 | 27 | ○ | 0.09 | ○ | ○ | 3 |
| | 2 | (η) | 0 | 20 | 0.100 | 180 | 180 | 12 | ○ | 0.29 | ○ | ○ | 0 |
| | 3 | (θ) | 10 | 20 | 0.100 | 180 | 180 | 3 | ○ | 0.30 | ○ | ○ | 0 |
| | 4 | (ι) | 50,000 | 20 | 0.100 | 180 | 180 | 12 | ○ | 0.31 | ○ | ○ | 1 |
| | 5 | (κ) | 2,000 | 1 | 0.100 | 120 | 240 | 4 | ○ | 1.05 | ○ | ○ | 6 |
| | 6 | (λ) | 2,000 | 5,000 | 0.100 | 120 | 240 | 25 | ○ | 0.05 | ○ | ○ | 4 |
| | 7 | (μ) | 2,000 | 20 | 0.000 | 120 | 240 | 11 | ○ | 0.32 | ○ | ○ | 2 |
| | 8 | (ν) | 2,000 | 20 | 0.001 | 120 | 240 | 11 | ○ | 0.32 | ○ | ○ | 8 |

TABLE 1-continued

| Titanium oxide fine particle dispersion | Reactant molar ratio Ti/V | Reactant molar ratio Ti/Sn | Amount of Cu added (%) | Hydrothermal treatment Temp. (°C.) | Hydrothermal treatment Time (min) | Test results Average particle size (nm) | Test results Presence of peroxotitanium component | Test results Concentration of peroxotitanium component (%) | Test results Dispersion stability | Test results Thin film transparency | Test results Gas decomposition (%) |
|---|---|---|---|---|---|---|---|---|---|---|---|
| 9 (ξ) | 2,000 | 20 | 5.000 | 120 | 240 | 15 | ○ | 0.32 | ○ | X | 0 |
| 10 (o) | 2,000 | 20 | 0.100 | 120 | 720 | 85 | X | 0.01 | X | X | 22 |
| 11 (π) | 2,000 | 20 | 0.100 | 120 | 60 | 10 | ○ | 3.50 | ○ | ○ | 0 |

INDUSTRIAL APPLICABILITY

The visible-light-responsive titanium oxide fine particle dispersion of the invention is useful in forming a photocatalyst thin film by applying it onto various substrates of inorganic materials such as glass and metals and organic materials such as polymer sheets (typically PET sheet) and especially forming a transparent photocatalyst thin film on polymer sheet.

The invention claimed is:

1. A visible-light-responsive titanium oxide fine particle dispersion comprising titanium oxide fine particles containing a peroxotitanium component, a vanadium component, and a tin component dispersed in an aqueous dispersing medium, and further comprising a copper component, wherein
　the vanadium component is present in such an amount relative to the titanium oxide as to give a molar ratio (Ti/V) in a range from 100 to 10,000,
　the peroxotitanium component is present in an amount of 0.05 to 2% by weight based on the titanium oxide,
　the tin component is present in such an amount relative to the titanium oxide as to give a molar ratio (Ti/Sn) in a range from 10 to 1,000,
　the copper component is present in an amount of 0.01 to 1% by weight based on the titanium oxide, when calculated as metallic copper.

2. The visible-light-responsive titanium oxide fine particle dispersion of claim 1 wherein the visible-light-responsive titanium oxide fine particles have a size as dispersed of 5 to 30 nm when expressed by a 50% by volume cumulative distribution diameter ($D_{50}$) measured by the dynamic scattering method using laser light.

3. The visible-light-responsive titanium oxide fine particle dispersion of claim 1, further comprising a binder.

4. The visible-light-responsive titanium oxide fine particle dispersion of claim 3 wherein the binder is a silicon compound-based binder.

5. A member having on its surface a photocatalyst thin film which is formed using the visible-light-responsive titanium oxide fine particle dispersion of claim 1.

6. A method for manufacturing the visible-light-responsive titanium oxide fine particle dispersion of claim 1, comprising the steps of:
　(1) providing a precursor titanium compound, a vanadium compound, a tin compound, a basic substance, hydrogen peroxide, and an aqueous dispersing medium to form a peroxotitanic acid solution containing the vanadium and tin compounds,
　(2) heating the peroxotitanic acid solution containing the vanadium and tin compounds at 80 to 250° C. to form a titanium oxide fine particle dispersion comprising titanium oxide fine particles containing a peroxotitanium component, vanadium component, and tin component, and
　(3) mixing the titanium oxide fine particle dispersion with a copper compound.

7. The method of claim 6, further comprising the step of adding a binder subsequent to step (3).

8. The method of claim 7 wherein the binder is a silicon compound-based binder.

9. A member having on its surface a photocatalyst thin film which is formed using the visible-light-responsive titanium oxide fine particle dispersion manufactured by the method of any one of claims 6 to 8.

10. The method of claim 6, wherein in the heating step (2), the peroxotitanic acid solution is heated at 80 to 250° C. under pressure of 0.01 to 4.5 MPa to form the titanium oxide fine particle dispersion.

* * * * *